United States Patent [19]

Trösch

[11] 4,215,717
[45] Aug. 5, 1980

[54] UNIDIRECTIONAL VALVE
[75] Inventor: Paul Trösch, Schaffhausen, Switzerland
[73] Assignee: Georg Fischer Limited, Switzerland
[21] Appl. No.: 914,186
[22] Filed: Jun. 9, 1978
[30] Foreign Application Priority Data
Jun. 24, 1977 [CH] Switzerland ............... 7764/77
[51] Int. Cl.² .................. F16K 15/06; F16K 15/14
[52] U.S. Cl. ....................... 137/533.25; 137/516.29
[58] Field of Search .............. 137/542, 543, 543.13, 137/543.21, 533.25, 516.29

[56] References Cited
U.S. PATENT DOCUMENTS

| | | | |
|---|---|---|---|
| 110,082 | 12/1870 | Snyder | 137/543.13 |
| 2,229,823 | 1/1941 | Sharp | 137/533.23 |
| 3,473,561 | 10/1969 | Svenson et al. | 137/543 X |

FOREIGN PATENT DOCUMENTS 535812 1/1957 Canada .................... 137/542
1475998 11/1970 Fed. Rep. of Germany .

Primary Examiner—William R. Cline
Attorney, Agent, or Firm—Roylance, Abrams, Berdo & Farley

[57] ABSTRACT

A unidirectional valve includes a generally tubular housing through which fluid can flow substantially in a straight line. The housing has an interior valve seat portion at the inlet end, in the direction of desired flow, and a valve member which is axially movable by the fluid medium. The valve member includes a rigid annular part and a flexible part and is carried by an axially movable guide member to which the rigid part of the valve member is attached The flexible portion consists of a tapered control skirt extending outwardly from the rigid part. Small differences in pressure or flow volume in the reverse direction cause the flexible part to move outwardly against a sliding surface on the interior of the housing, moving the valve member axially toward the valve seating surface in the closed position. Flow in the desired direction causes the skirt to move axially and fold toward the rigid portion. Various embodiments of the valve member and guide arrangements are shown.

6 Claims, 15 Drawing Figures

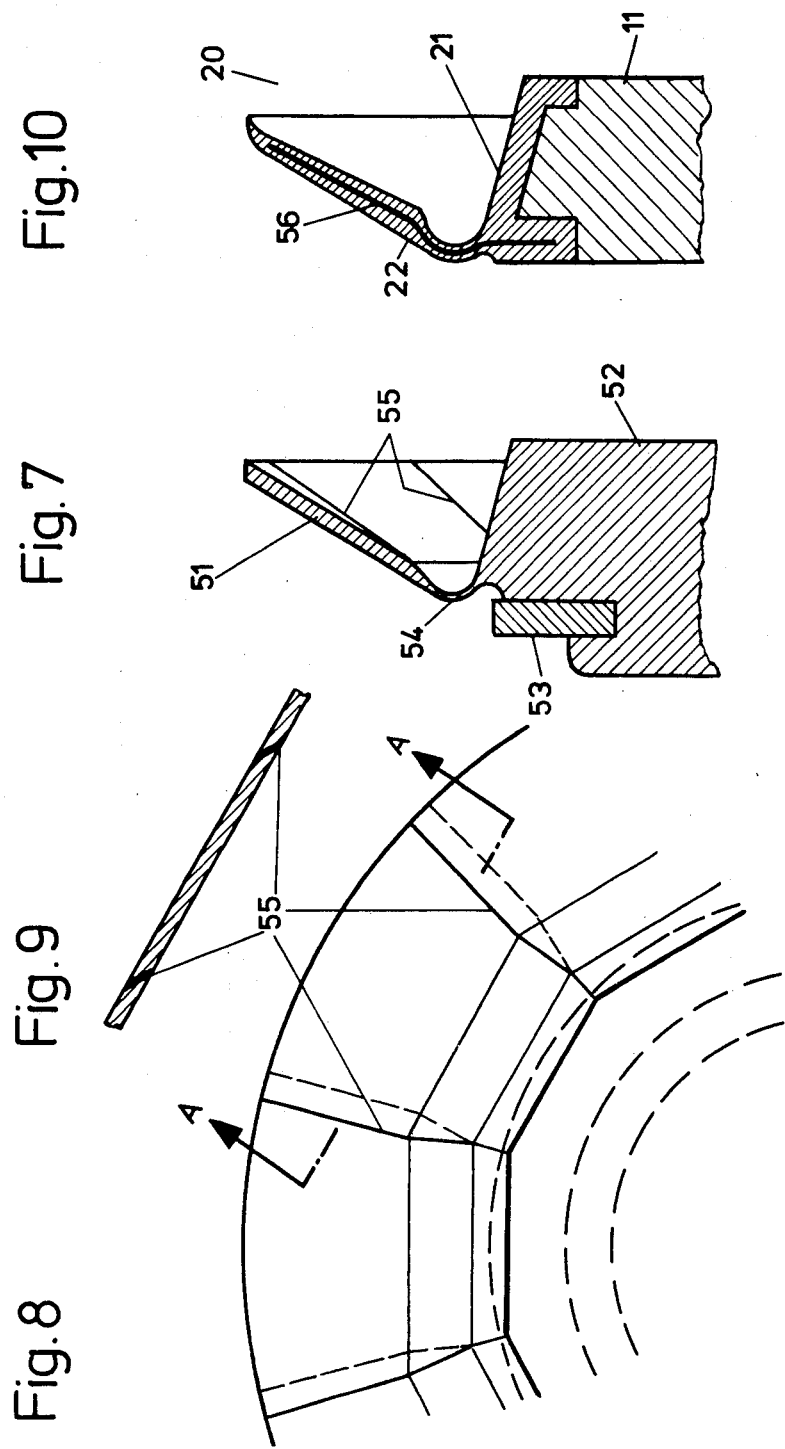

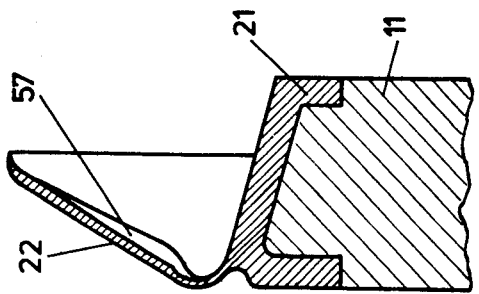
Fig.11
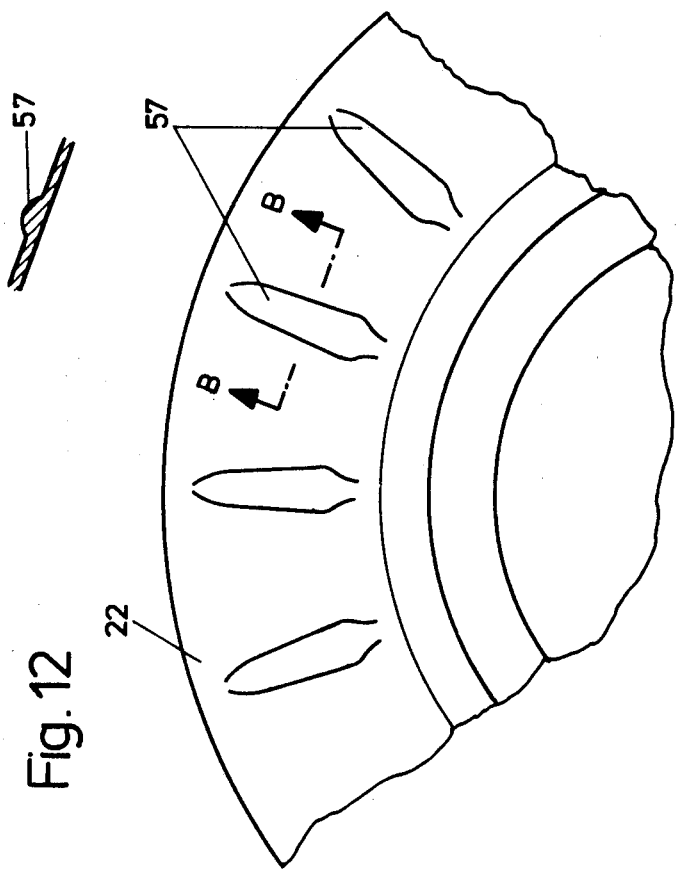
Fig.12
Fig.13

UNIDIRECTIONAL VALVE

This invention relates to a unidirectional valve having a tubular housing and an axially movable valve member which is displaced by the medium flowing through the valve.

BACKGROUND OF THE INVENTION

The prior art includes nonreturn or unidirectional valves of the general type with which the present invention is concerned. One example of such a valve is found in German Auslegeschriften No. 1,475,998, which has an insertion member installed axially in a housing, the member being connected with crosspieces to a ring forming a sealing surface on the front, or upstream, side, and is fastened in the housing by the ring. The valve seal, with the external diameter of the rigid, ring-shaped part is inserted directly in a cylindrical guide of the housing so that it can move axially. During the closing movement it is supported on a cylindrical part of the insertion member with the interior diameter of the flexible part. Perfect guidance of the seal during the axial movement is not guaranteed by this arrangement which results in tilting of the seal and, thus, in operational breakdowns. Since the sealing takes place at the largest diameter of the joint, only small specific surface pressures occur at the sealing surface. For that reason, a sufficient sealing effect is not obtained when there are small differences in pressure in the line. Furthermore, large differences in pressure are necessary for opening the flexible seal lip because of its placement at the inner part of the seal. Because of these disadvantages, the assembly does not function reliably when it is installed in the horizontal position and under conditions of small differential pressure or small flow quantities.

BRIEF DESCRIPTION OF THE INVENTION

An object of the present invention is to provide a springless nonreturn or unidirectional valve which functions reliably, with simple mounting in all working positions, with even small differences in pressure and which is not subjected to excessive mechanical strains or to wear at high pressures.

Briefly described, the invention includes a unidirectional valve comprising a generally tubular housing having a through passage for substantially linear flow of a fluid medium, said housing having an annular radially inwardly extending valve seat portion at one end thereof, and means for defining coaxial guide openings at opposite ends thereof; a guide member extending axially through said guide openings, said guide member being axially slidable relative to said housing; a valve member carried by and axially movable with said guide member within said housing by said medium between open and closed positions, said valve member comprising a rigid annular portion fixedly attached to said guide member, a generally annular flexible portion extending outwardly from said rigid portion to form a control skirt which is foldable inwardly toward said rigid portion, and means interconnecting said rigid and flexible portions, said rigid and flexible portions being movable with said guide member away from said valve seat to said open position by fluid flow in a first direction and being movable toward and into sealing engagement with said valve seat portion in said closed position by fluid flow in the opposite direction.

In order that the manner in which the foregoing and other objects are attained in accordance with the invention can be understood in detail, particularly advantageous embodiments thereof will be described with reference to the accompanying drawings, which form a part of this specification, and wherein:

FIG. 7 is an enlarged partial view, in partial section, of a valve member usable in the structures of FIGS. 1–6;

FIG. 8 is a partial front elevation, enlarged, of the valve member of FIG. 7;

FIG. 9 is a partial section along line A—A of FIG. 8;

FIG. 10 is an enlarged partial sectional view of a further embodiment of a valve member usable in the apparatus of FIGS. 1–6;

FIG. 11 is an enlarged partial view, in section, of a valve member usable in the apparatus of FIGS. 1–6;

FIG. 12 is an enlarged partial end elevation of the valve member of FIG. 11;

FIG. 13 is a partial sectional view along line B—B of FIG. 12;

Figure 1:
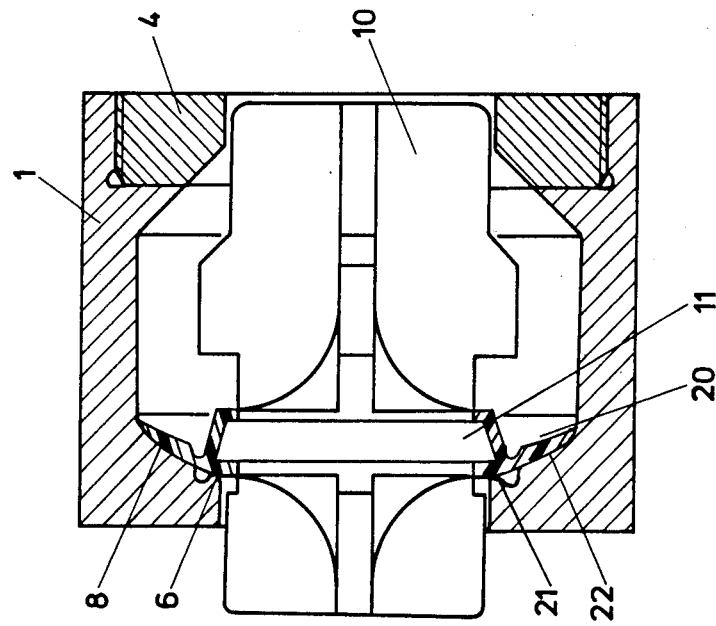
FIG. 1 is a longitudinal side elevation in partial section of a first embodiment of a unidirectional valve in accordance with the present invention, the valve being shown in the open or flow-through position.
Figure 2:
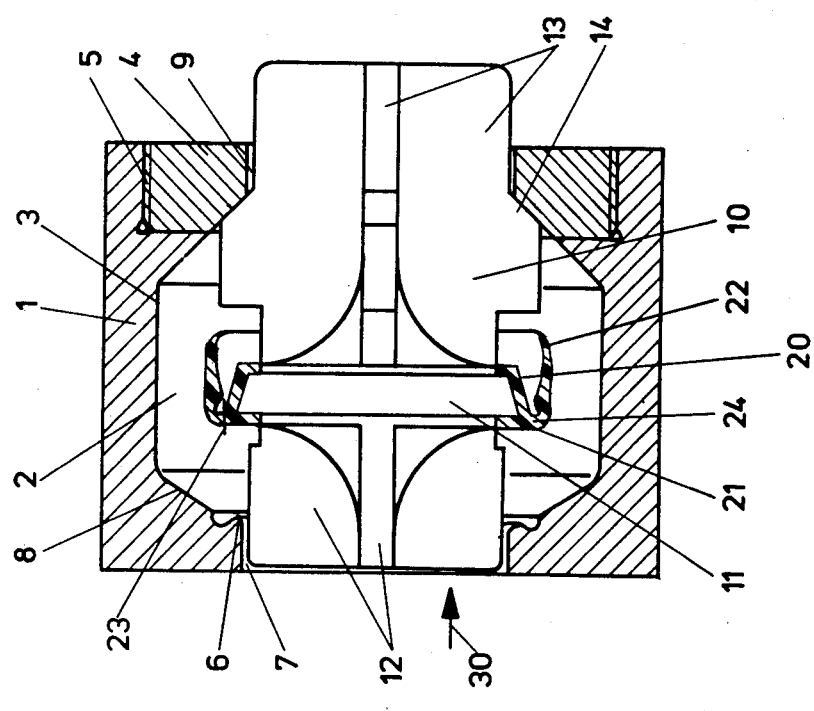
FIG. 2 is similar to FIG. 1 showing the valve in the closed position.
Figure 3:
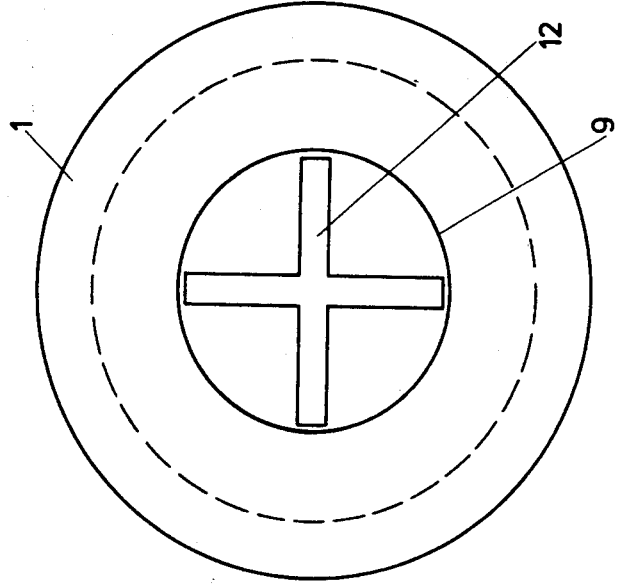
FIG. 3 is an end elevation, as viewed from the left, of FIGS. 1 or 2.

The first embodiment of the valve structure to be discussed is shown in FIGS. 1–3 and includes a generally tubular housing 1 having a central passage 2 extending therethrough, the passage 2 having a cylindrical gliding surface 3 in the central region thereof. A flange 4, in the form of an annular externally threaded ring, is provided at the outlet end of the housing, the external threads of flange 4 being threadedly engaged with internal threads 5 in an annular recess at the outlet end of housing 4. Within the housing is a guide member 10 which extends axially through the passage in the housing and which carries a steel or valve member 20 at a location intermediate the ends thereof. As will be apparent from the drawings, the housing is formed as a body of rotation, i.e., a body which is cylindrical in shape, and which is provided with a radially inwardly extending portion at the front or upstream end thereof forming a valve seat portion 6 adjacent a circular opening 7 which is centered on the longitudinal axis of the housing. A generally frustoconical tapered surface 8 extends between gliding surface 3 and the valve seating portion 6. As shown in FIGS. 1 and 2, the profile of the valve seating surface is preferably formed with a relatively abrupt but curved cross section. Such surface should not be flat, i.e., directly radial, but should also not have a sharp edge to avoid damage to the valve member. The actual shape thereof depends upon the material of the seal used in the valve member and on the differential pressures anticipated.

The closing flange 4 is also provided with a central opening 9 which is concentric with the longitudinal axis of the passage through housing 1 and coaxial with opening 7 so that the guide member 10 which extends through openings 7 and 9 can be displaced axially. Guide member 10 includes a valve disc 11 and means defining guide surfaces which, in this embodiment, include a plurality of radially outwardly extending ribs 12 and 13, these ribs being located on opposite axial sides of disc 11. As can be seen in FIG. 3, this embodiment is provided with four such guide ribs, separated by 90°, the outer surfaces of the ribs being adjacent the inner surfaces of openings 7 and 9. It has been found, however, that three ribs in each location are sufficient for satisfactory guidance. Each of the guide ribs 13 is provided with a sloping shoulder 14 which cooperates with a conical surface on the interior of flange 4 to define a stop position for guide member 10 denoting the limit of axial movement of the guide member in the downstream direction.

The valve member or seal 20 is firmly attached to the circumference of the valve disc 11 and is provided with a rigid annular portion 21 and a flexible, tapered control lip or skirt 22 which is attached to the outer diameter of rigid portion 21 by means interconnecting the rigid and flexible portions, this consisting of a film hinge or articulation 24, the hinge being also annular in shape.

FIG. 1 shows the unidirectional valve in the open or flow-through position with the fluid medium flowing in the direction indicated by arrow 30. The guide member 10 is thus lying with its stop shoulders 14 abutting flange 4 and with the control skirt 22 of seal 20 folded inwardly toward the rigid portion, the folding being accomplished by the medium flowing through the passage in housing 1 in a direction which is substantially parallel to gliding surface 3. As a result in this arrangement, a relatively large cross-sectional area for flow-through of the fluid medium results. The elasticity of the flexible control skirt 22 can be improved by providing one or more radial indentations 55 which will be further discussed in connection with FIGS. 8 and 9.

When pressure is equalized, the flexible control skirt 22 is capable of promptly moving outwardly, closer to a radial position with respect to the rigid portion, as shown in FIGS. 4, 7, 10 and 11. Thus, with no differential pressure or flow, the control skirt erects to a position such that a large control surface, available for contact by flow in the direction of arrow 31 (FIG. 4) is immediately available and a slight reverse pressure is therefore capable of acting against this surface and causing axial movement of the guide member and valve member toward the closed position.

FIG. 2 shows the valve in the closed position wherein the diameter of the control skirt 22 increases the controlling sensitivity. In that position, the annular rigid portion 21 of the seal 20 comes in full contact with the valve seating surface 6, and also the upstream surface of the control skirt 22 comes into close abutting relationship with the conical surface 8 of housing 1.

In this relationship of components lying next to each other, the control skirt is completely free of forces tending to bend the skirt in an undesired direction, and the skirt portion is subjected to no pressures. Thus, it is fully supported by the relatively massive structure of housing 1. In many cases, the equalization of pressure will even take place, since the pressure medium can also work on the control skirt 22 from behind. The actual closing function is controlled by the inner residual surface of the value disc and by the relatively rigid annular portion 21 of the seal. In that connection, it is particularly advantageous that the annular part 21 is installed at the smallest diameter of the seal 20 such that the axial force to be received by part 21 is small, even at high pressures.

Figure 5:
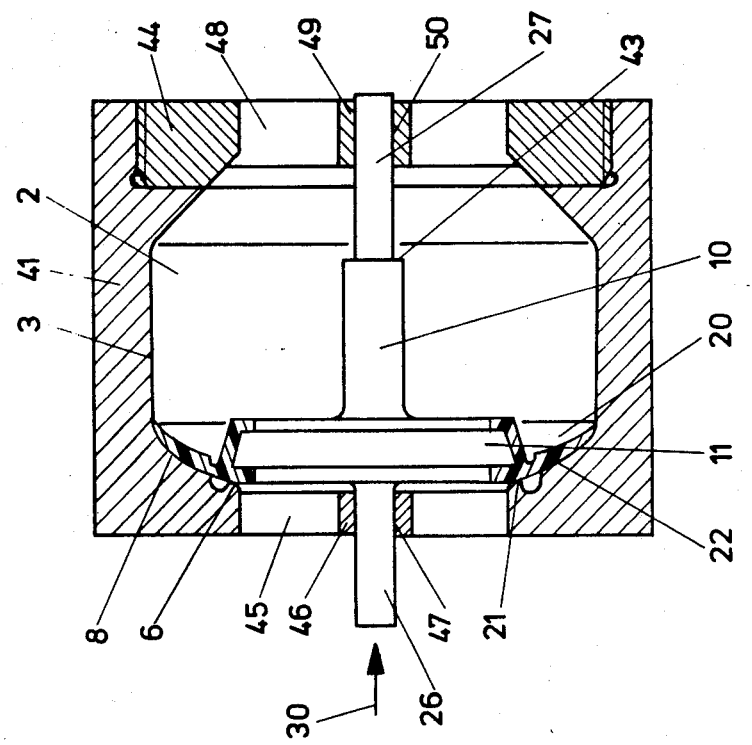
FIG. 5 is a view similar to FIG. 4 showing the valve in the closed position.
Figure 4:
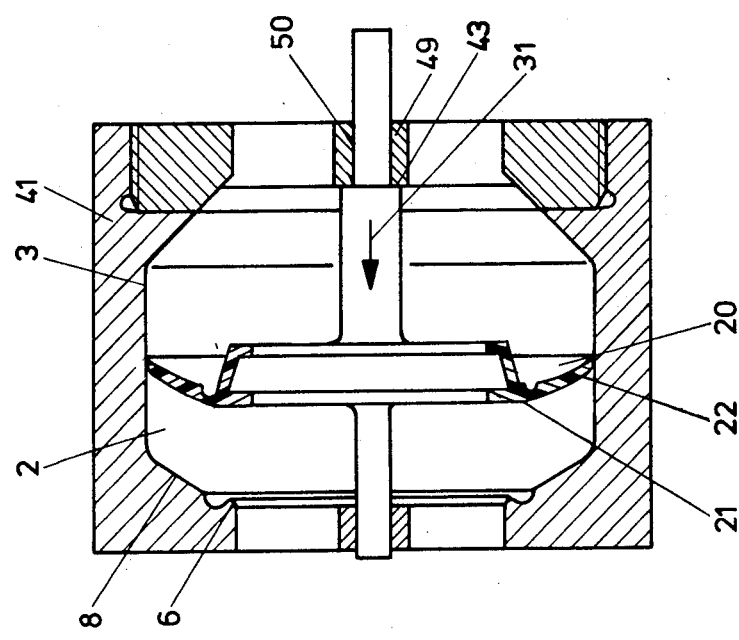
FIG. 4 is a longitudinal side elevation in partial section of a second embodiment of a valve in accordance with the present invention.
Figure 6:
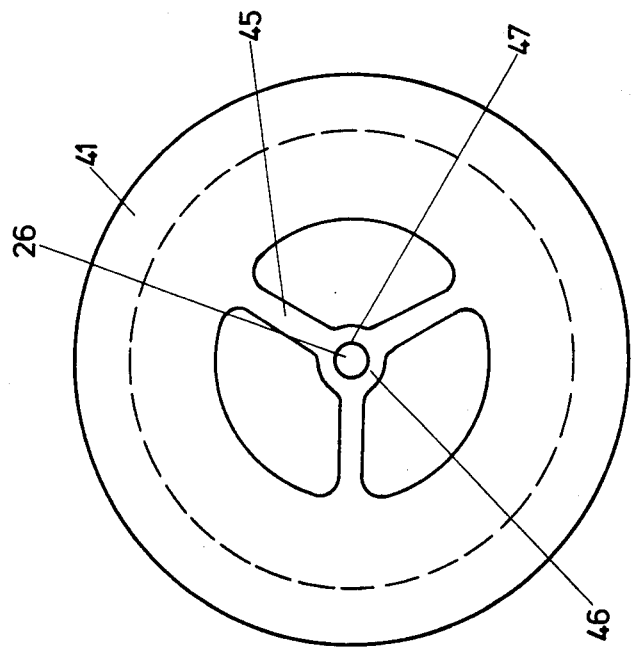
FIG. 6 is an end elevation, from the left-hand end, of the valve of FIGS. 4 and 5.

FIGS. 4, 5 and 6 show a further embodiment of the unidirectional valve. In this embodiment, the guiding surfaces of the guide member 10 consist of cylindrical pins 26 and 27 which are located on opposite sides of valve disc 11. Both the housing 41 and the closing flange 44 are provided with guide bosses 46 and 49 which are mounted to housing 41 and flange 44, respectively, by "spiders" or crosspieces 45 and 48 as seen in FIGS. 5 and 6. Drilled holes 47 and 50, which are concentric with each other and with the central axis of the passage, pass through bosses 46 and 49, respectively, centrally locate guide member 10 by pins 26 and 27 so that the guide member and seal assembly can be displaced axially. Pin 27 has a stop shoulder 43 of enlarge diameter formed thereon to limit the extent of axial movement in the opening direction. The remainder of housing 41, including the closing flange 44 and the seal 20 and the manner of operation thereof correspond to the embodiment described with reference to FIGS. 1–3.

The construction of the seal 20 is of considerable significance, as is the particular construction of the film hinge identified as 24 and 54 in the subsequent figures. FIG. 7 shows a further specific embodiment of the seal structure. In that figure, the flexible control skirt 51 is formed, as by molding, directly to the valve disc 52 while the sealing ring 53, which corresponds to the rigid annular portion 21, is inserted separately. The film hinge 54 has been oriented by a separate process as, for example, by pressing. As a result, its alternating bending strength is appreciably improved. In some cases, it is desirable to form the seal with radially extending inserts 55 of a thermoplastic material placed in diagonally extending slits as seen in FIGS. 8 and 9.

FIG. 10 shows a further embodiment of the seal 20 in which the valve disc 11, the annular portion 21 and the control skirt 22 correspond functionally to FIGS. 1–5. A reinforcing insert 56 is embedded in the seal 20 in this embodiment. Insert 56 can consist of a high strength cloth, for example, but can also consist of a thermoplastic, with or without an oriented film articulation, as shown in FIG. 7. Insert 56 can have openings for the purpose of providing better anchoring between thermoplastic and elastomer.

Figure 14:
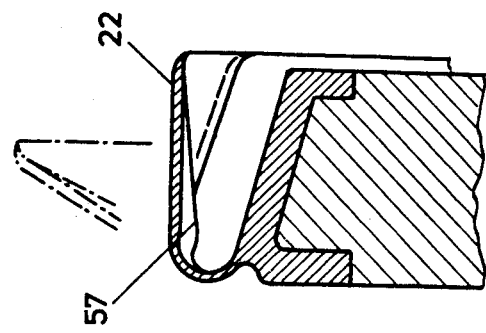
FIG. 14 is an enlarged partial side elevation, in section, of the valve member of FIGS. 11–13, shown in the open position.
Figure 15:
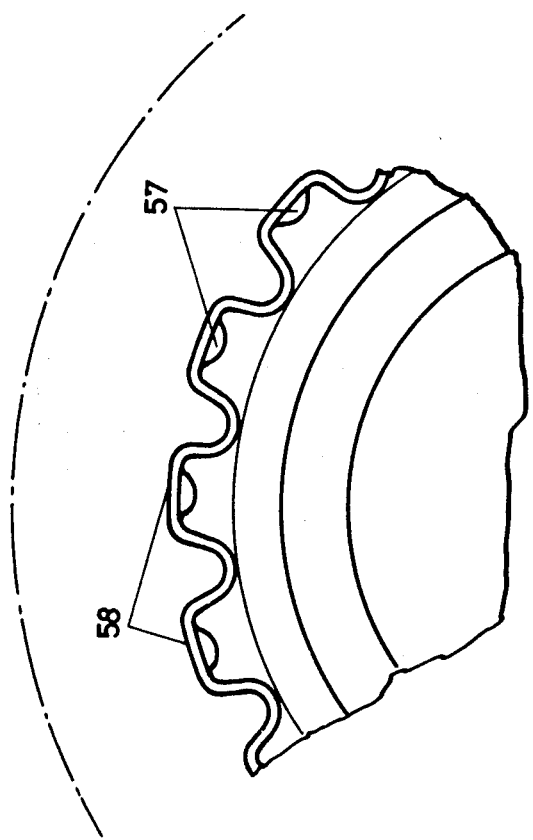
FIG. 15 is a partial end elevation of the valve member of FIG. 14.

FIGS. 11–15 show a further embodiment of the seal. As shown therein, means defining ribs 57 are formed in the control skirt 22. FIGS. 11, 12 and 13 show the control skirt 22 in the raised position with equalization of pressure, or in the closed position of the valve, while FIGS. 14 and 15 show the member in the open position. The proper closed position is shown in FIGS. 11 and 12. By means of the ribs 57, it is possible to force a preprofiling in such a way that the control skirt can form itself into a uniform wave profile all around when the valve is in the open position. Materials of high bending fatigue strength are used for the seals. Furthermore, with valves intended to conduct a chemically aggressive medium, high stability in the materials must be demanded. Of the elastomers, preference is given to polyurethane, natural rubber, butadiene-styrene rubber, ethylenepropylene-terpolymer rubber and vinylidene fluoride-hexafluoropropylene rubber.

Preferably for producing the oriented film hinge 54, thermoplastics of the polyamide, polyoxymethylene, polypropylene, cross-linked polyethylene, ionically polymerized polyethylene, aromatic polyester, polyethylene glycol terephthalate, polybutylene glycol terephthalate types, copolymers of tetrafluoroethylene and hexafluoropropylene, modified copolymers from approximately 25% of ethylene and approximately 75% of tetrafluorethylene, etc., can also be used.

Metals and plastics are used as materials for the housings 1 and 41 and for the guide member 10. For these, preference is to be given to wear-resistant coatings at the gliding surface 3, by means of housings of polyethylene glycol terephthalate, polybutylene glycol terephthalate, polyoxymethylene, etc., for example.

The inner contour of the housings 1 and 41, and particularly the gliding surface 3, can advantageously be given a coating of a low friction material such as fluoropolymers or polyphenyl sulfide, and the like.

The unidirectional valve of this invention does need an expensive torpedo-shaped insertion member in the housing, but nevertheless a distribution of functions is made possible for the seal. The static closing pressure works on a small diameter and, as a result, a large excess pressure can be withstood by a relatively small sealing surface. Under those conditions, the flexible control skirt is supported by the housing. The small differences in pressure, which are important in control technology, take effect on a large diameter of the control skirt which brings about a quick closing or opening and a good sealing effect, even with small differences in pressure. For that reason, the springless unidirectional valve of the invention operates reliably and with little wear wherever it is installed with large or small differences in pressure.

While certain advantageous embodiments have been chosen to illustrate the invention, it will be understood by those skilled in the art that various changes and modifications can be made therein without departing from the scope of the invention as defined in the appended claims.

What is claimed is:

1. A unidirectional valve comprising
    a generally tubular housing having a through passage for substantially linear flow of a fluid medium, said housing having
        an annular radially inwardly extending valve seat portion at one end thereof, and
        means for defining coaxial guide holes at opposite ends of said housing;
    a guide member extending axially through said guide holes, said guide member being axially slidable relative to said housing and including
        a valve disc for carrying a valve member, and
        means defining guide surfaces on opposite axial sides of said valve disc, said guide surfaces including a plurality of guide ribs extending radially outwardly from the central axis of said housing and extending through said guide holes;
    a valve member carried by and axially movable with said valve disc within said housing by said medium between open and closed positions, said valve member comprising
        a rigid annular portion fixedly attached to said valve disc,
        a generally annular flexible portion extending outwardly from said rigid portion to form a control skirt which is foldable inwardly toward said rigid portion, and
        means including a generally annular articulation film hinge interconnecting said rigid and flexible portions;
    said rigid and flexible portions being axially movable with said guide member away from said valve seat to said open position by fluid flow in a first direction and being axially movable toward and into sealing engagement with said valve seat portion in said closed position by fluid flow in the opposite direction;
    and wherein the passage through said housing includes
        an interior cylindrical surface dimensioned to be contacted in sliding relationship by the periphery of said flexible portion of said valve member as said member moves to said closed position, and
        means defining a tapered, generally frusto-conical surface extending outwardly from said valve seat portion to said cylindrical surface, said tapered surface being in abutting relationship with said flexible portion in said closed position.

2. A valve according to claim 1 wherein said film hinge includes a flexible insert of a material having high bending fatigue strength.

3. A valve according to claim 1 wherein said flexible portion includes means defining at least one generally radially extending indentation.

4. A valve according to claim 1 wherein said means interconnecting said rigid and flexible portions comprises a film hinge formed from an oriented thermoplastic.

5. A valve according to claim 1 wherein said rigid portion, said flexible portion and said means interconnecting said rigid and flexible portions are integrally formed as a single element.

6. A valve according to claim 1 wherein said flexible portion includes means thereon defining a plurality of radially extending ribs.

* * * * *